United States Patent [19]
Dinan et al.

[11] Patent Number: 5,025,483
[45] Date of Patent: Jun. 18, 1991

[54] SYSTEM FOR SCANNING DOCUMENTS WITHOUT LOSS OF IMAGE DATA

[75] Inventors: Raymond F. Dinan, Mint Hill; Hugh C. Fallon; Jerald R. Malin, both of Charlotte; Robert R. Rodite, Matthews; Clair F. Rohe, Charlotte; Gene D. Rohrer, Concord, all of N.C.

[73] Assignee: International Business Machines Corporation, Armonk, N.Y.

[21] Appl. No.: 469,967

[22] Filed: Jan. 25, 1990

Related U.S. Application Data

[63] Continuation of Ser. No. 134,493, Dec. 18, 1987, abandoned.

[51] Int. Cl.⁵ ............................................. G06K 9/20
[52] U.S. Cl. ...................................... 382/58; 382/57; 358/404
[58] Field of Search ........................... 382/57, 58, 65; 235/288, 476, 481; 358/404

[56] References Cited

U.S. PATENT DOCUMENTS

| | | | |
|---|---|---|---|
| 3,805,025 | 4/1974 | Sanigar | 235/476 |
| 4,367,493 | 1/1983 | Matteson | 358/288 |
| 4,574,351 | 3/1986 | Dang et al. | 364/200 |
| 4,590,606 | 5/1986 | Rohrer | 382/7 |
| 4,591,727 | 5/1986 | Gaebelein | 250/578 |
| 4,748,514 | 5/1988 | Bell | 358/288 |

Primary Examiner—Michael Razavi
Assistant Examiner—Yon Jung
Attorney, Agent, or Firm—Bell, Seltzer, Park & Gibson

[57] ABSTRACT

A document processing system directs documents at a high rate of speed past an optical scanner which captures written information on the documents as video image data. The video image data is directed over a data channel to a host computer system where the data is stored on a mass data storage device for subsequent retrieval. A buffer is provided between the scanner and the data channel, which receives data a rate which varies in relation to the amount of information present on the documents. Data is extracted from the buffer at a rate which is limited by the host computer's channel transfer rate. A control means is associated with the buffer and is operable for controlling a hierarchy of actions ranging from slowing down the incoming data stream to stopping the data stream altogether in order to prevent any loss of video image data due to overfilling of the buffer.

10 Claims, 1 Drawing Sheet

SYSTEM FOR SCANNING DOCUMENTS WITHOUT LOSS OF IMAGE DATA

This application is a continuation of application Ser. No. 07/134,493, filed on Dec. 18, 1987, now abandoned.

FIELD OF THE INVENTION

This invention relates to the scanning of documents, and more particularly relates to the processing and handling of video image data from documents. This invention is especially concerned with systems which capture an electronic image of documents, particularly financial documents such as bank checks, so that the image data can be processed, stored, and subsequently utilized to recreate the image in printed form or on a video display device.

Documents such as bank checks are conventionally processed by financial institutions on a high speed reader/sorter, which operates at a relatively high rate of speed on the order of about 2,400 documents per minute. As the documents are processed through the reader/sorter, they are directed past an MICR reader which reads the magnetic ink characters on the documents. The documents may also be directed past a microfilming station which microfilms both the front and the back of the document. The document is subsequently sorted into one of a number of output bins.

Document processing systems have been proposed which employ video image processing for capturing a video image of the front and back of the document in lieu of or in addition to the microfilming. One such system is disclosed in commonly owned copending U.S. Pat. Nos. 4,888,812 issued on Dec. 19, 1989.

The information contained on the documents typically include both sharp high contrast images, such as printed numbers and signatures, as well as lower contrast information, such as stamps and endorsements. In order to obtain a high quality image which captures both the high contrast images and the lower contrast images, the image needs to be captured at a high resolution in a number of levels of gray. This requires a relatively large amount of video image data. The large amount of video image data per document, coupled with the high speed of processing of the documents generates extremely high volumes of video image data. To be able to handle video image data at such high volumes for a sustained period of time presents significant technological challenges. Additional challenges are presented in providing a feasible way to store and retrieve such massive amounts of video image data. These problems are addressed in the video image system described in the aforementioned commonly owned copending application.

An ancillary problem in dealing with high volumes of video image data arises from the variation in the amount of video image data which may be captured from the documents. In this regard, the documents which are processed may vary in size and in information content. For example, in a system which scans and captures video image data from both sides of financial documents such as bank checks, the number of endorsements may vary, and the amount of printed information present on the face of the check may vary, depending upon such factors as whether the check is a personal check or business check, where the checks were cashed, etc. Consequently, the amount of video image data captured for each document may be of variable length. Thus, there can be a wide variance in the rate of image data transfer from the document scanning system to a system, such as a mass data storage device, which receives the image data. Since the receiving system has a definite maximum data transfer rate, it is important to insure that no loss of image data occurs in the event that the peak image data rate from the scanning system may exceed the data rate capacity of the receiving system.

The present invention addresses this problem and provides a method and means which insures that no loss of image data occurs in such an event.

SUMMARY OF THE INVENTION

The present invention employs a buffer for intermediate storage of image data between capture of the image data and final storage of a compressed image. This buffer receives data at a rate which varies in relation to the amount of information present on the documents. Feeding of the data into the buffer cannot be instantaneously stopped, since documents in process must continue to process. Data is extracted from the buffer at a rate limited by the host computer,s channel transfer rate. In accordance with the invention, document processing is allowed to continue while there is room in the buffer, but the document processing is caused to slow down or stop before the buffer overfills, leading to a loss of data.

The system of the present invention includes a document feed for feeding successive documents from a hopper to a document transport, a document transport for advancing each successive document past a document scanner, and a document scanner for scanning the successively transported documents and for generating therefrom a stream of video image data which varies in relation to the amount of information present on the document. The buffer is arranged for receiving and temporarily storing the video image data from the document scanner, and data output means cooperates with the buffer for extracting video image data from the buffer. A control means is associated with the buffer and is operable for controlling a hierarchy of actions ranging from slowing down the incoming data stream to stopping the data stream altogether. More particularly, if the buffer fills to a first predetermined limit, then feeding of additional documents from the hopper onto the document transport is stopped and the documents already in the transport are allowed to continue in process. Also, if the rate at which the buffer is filling is greater than a predetermined limit, then feeding of additional documents from the hopper into the document transport is stopped and documents already in the transport are allowed to continue in process. This condition can be detected at any time before the buffer has filled to the first predetermined full limit. When the buffer has been sufficiently emptied, document feeding is resumed. If the buffer should completely fill, then image data could be lost which would result in destroying the data integrity of the entire data stream. Therefore, means is provided for immediately stopping the transport of the document past the scanner when the buffer fills to a predetermined upper limit. Thus, image data transfer from the scanner is immediately halted.

Some of the features and advantages of the invention having been stated, others will appear from the detailed description which follows and from the accompanying drawings.

DETAILED DESCRIPTION OF THE DRAWINGS

Figure 1:
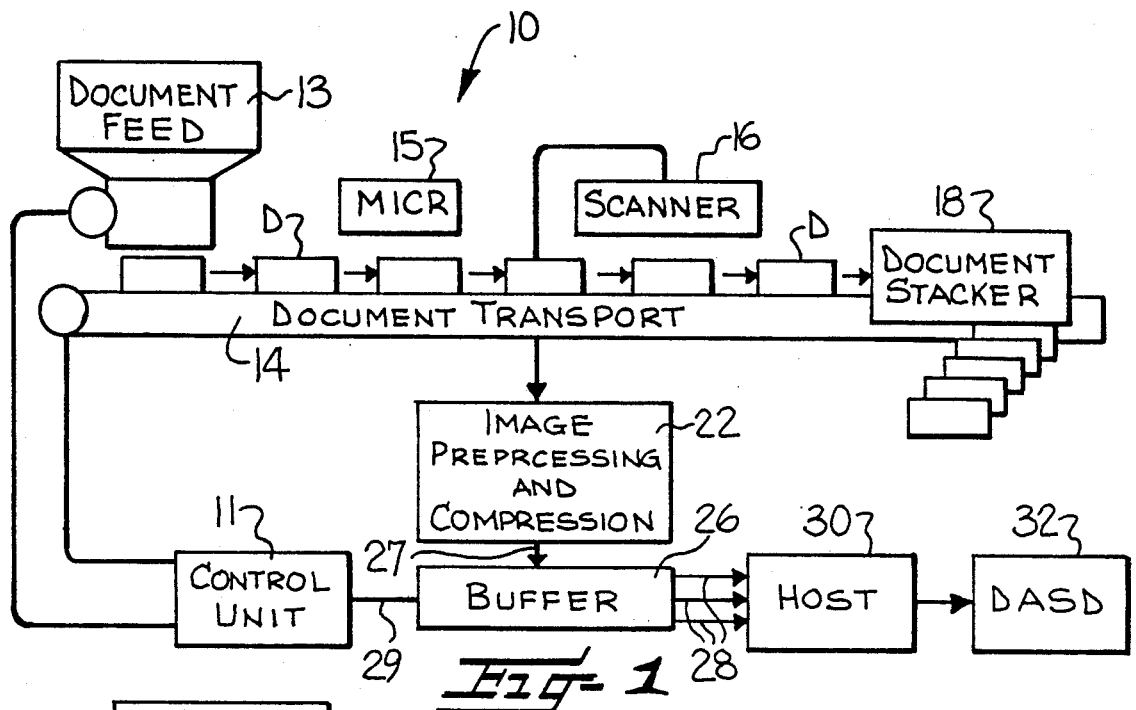
FIG. 1 is a schematic view of a document processing system incorporating our invention.

In the document processing system illustrated in FIG. 1, the reference character 10 generally indicates a commercially available high speed document reader/sorter, such as the IBM 3890 reader/sorter which is capable of handling documents at a rate of speed on the order of about 2,400 documents per minute. A document reader/sorter of this type includes a control unit 11 and a document feed 13, typically including a hopper for receiving a supply of documents and a feed mechanism for directing the successive documents from the hopper to a document transport 14. As illustrated, the document transport 14 is constructed to receive and accommodate a plurality of documents D and to transport the documents D successively past an MICR module 15 which reads information encoded on magnetic ink characters on the documents. The documents are also directed past a scanner 16 which is adapted to optically scan one or both sides of the successive documents and to convert the information thereon into a stream of video image data. After passing the document scanner 16, the successive documents are advanced by the document transport 14 to a document stacker 18 which receives and stacks the documents. The scanner may, for example, comprise a charged coupled device (CCD) scanner array which generates a sequence of analog values representing light and dark areas defining the image on the document. Through an analog to digital converter, these analog values are converted into a binary representation of the image.

As illustrated in FIG. 1 the video image data from the scanner is directed to an image preprocessing and compression unit 22 where the data is filtered, thresholded and converted into binary form, and where if desired, suitable data compression techniques can be performed to reduce the volume of data. The thus processed image data is then directed into a buffer 26. Video image data is read into the buffer 26 via an input data bus 27. Data is read out of the buffer 26 via a high speed data channel 28. The rate of data transfer into the buffer 26 is dependent upon the amount of information contained on the documents and the efficiency of the data compression. The rate of transfer out of the buffer is limited by the maximum data transfer capacity of the data channel 28. In the embodiment illustrated the data is read from the buffer through channel 28 of a host computer 30 which, in turn, stores the data temporarily on a suitable storage medium, for example a direct access storage device (DASD) 32 such as magnetic disk memory. The buffer 26 is also connected to the control unit 11 via control line 29.

Figure 2:
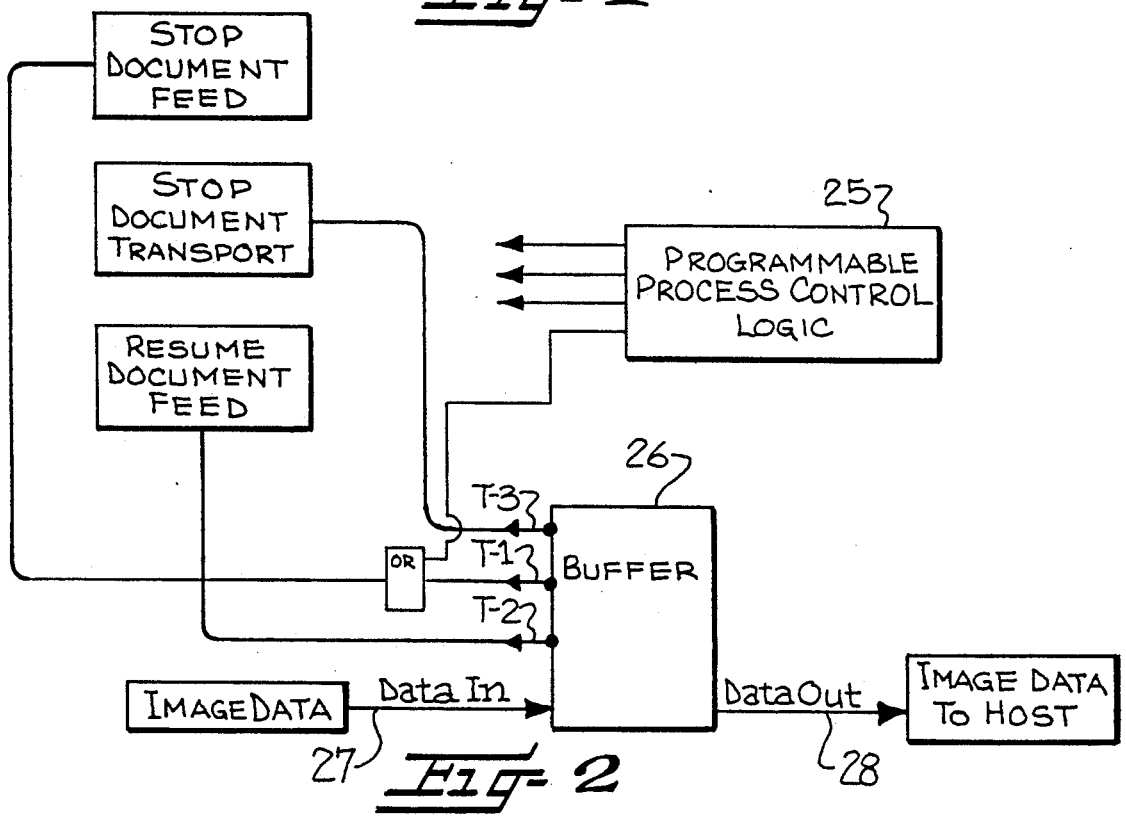
FIG. 2 is a schematic view showing the control functions associated with the buffer.

FIG. 2 schematically illustrates the control functions carried out by the control unit 11 associated with the buffer 26. Image data is read into the buffer 26 by data input channel 27 at a rate which is a function of the amount of information present on the documents and the efficiency of the image processing and compression unit 22 in reducing the data volume. Loading of data into the buffer cannot be instantaneously stopped, since a number of documents are queued by the document transport 14 for scanning by the scanner 16. Stopping of the transport 14 during the scanning of a document would cause a loss of data integrity for that document and would necessitate rescanning. The programmable process control logic 25 monitors the rate of data flowing into the data buffer (number of compressed data bytes per number of documents). If the rate at which the buffer is filling is greater than a predetermined limit, then a signal is initiated to stop the document feed 13 from putting documents into the transport. Also, in order to avoid loss of data integrity by interrupting the scanning of a document and to avoid loss of data due to overfilling of the buffer, when the buffer fills to a predetermined first threshold, indicated at T1 in FIG. 2, the feeding of additional documents by the document feed 13 is stopped. The documents already present in the document transport 14 are allowed to continue in process. When the buffer 26 has been sufficiently emptied to a second predetermined threshold T2, feeding of the documents by the document feed 13 is resumed.

It will be appreciated that the particular setting of the first threshold T1 must take into account the rate at which data is being read into the buffer and being read out to the buffer as well as the size of the buffer and the volume of data already present in the information pipeline (i.e. those documents already queued on the document transport for scanning) in order that those documents already in the information pipeline will not overfill the buffer.

As a fail safe measure, in order to avoid loss of data integrity, if the buffer is filled to a predetermined maximum threshold T3 at or near the maximum capacity of the buffer level, the document transport 14 is immediately stopped and thus the flow of data from the scanner 16 to the buffer 26 is immediately halted.

That which is claimed is:

1. A system for capturing video image data from documents comprising document feed means for feeding successive documents from a hopper to a document transport, document transport means for receiving each successively fed document and advancing the respective documents past a document scanner, document scanner means for scanning the successively transported documents and for generating therefrom video image data, the quantity of which may vary widely depending upon the amount of information present on the document, a buffer for receiving and temporarily storing video image data, data input means for directing video image data obtained from said document scanner means into said buffer, data output means cooperating with said buffer for extracting video image data from the buffer, and control means cooperating with said buffer and operable to perform a hierarchy of control actions over the flow of video image data into said buffer to assure data integrity and prevent loss of data, said control means including a first control action means operable in response to the level of stored data in said buffer reaching a first threshold for effecting stopping of the feed of additional documents by said document feed means while allowing documents already in the document transport to continue in process, and a second control action means for sensing the rate at which said buffer is filling with data, and in response to said rate exceeding a predetermined limit, said second control action means being operable for effecting stopping of the feed of additional documents by said document feed means even though said first threshold may not have been met.

2. The system as defined in claim 1 wherein said document transport means includes means for receiving and transporting a plurality of successive documents between said document feed means and said document scanner means.

3. The system as defined in claim 1 wherein said control means includes an additional control action means operable in response to the level of stored data in said buffer reaching a second threshold lower than said first threshold for effecting resuming of the feed of documents by said document feed means.

4. The system as defined in claim 3 wherein said control means includes an additional control action means operable in response to the level of stored data in said buffer reaching a third threshold higher than said first threshold for effecting immediate stopping of the transport of documents by said document transport means so as to thereby immediately stop the flow of additional data to said buffer to thus prevent overflow and loss of data.

5. A system for capturing video image data from documents comprising
   document feed means for feeding successive documents from a hopper to a document transport,
   document transport means for receiving each successively fed document and advancing the respective documents past a document scanner,
   document scanner means for scanning the successively transports documents and for generating therefrom video image data, the quantity of which may vary widely depending upon the amount of information present on the document,
   a buffer for receiving and temporarily storing video image data,
   data input means for directing video image data obtained from said document scanner means into said buffer,
   data output means cooperating with said buffer for extracting video image data from the buffer, and
   control means cooperating with said buffer and operable to perform a hierarchy of control actions over the flow of video image data into said buffer to assure data integrity and prevent loss of data, said control means including
   a first control action means operable in response to the level of stored data in said buffer reaching a first threshold for effecting stopping of the feed of additional documents by said document feed means while allowing documents already in the document transport to continue in process,
   a second control action means for sensing the rate at which said buffer is filling with data, and in response to said rate exceeding a predetermined limit, said second control action means being operable for effecting stopping of the feed of additional documents by said document feed means even though said first threshold may not have been met,
   an additional control action means operable in response to the level of stored data in said buffer reaching a second threshold lower than said first threshold for effecting resuming of the feed of documents by said document feed means; and
   an additional control action means operable in response to the level of stored data in said buffer reaching a third threshold higher than said first threshold for effecting immediate stopping of the transport of documents by said document transport means so as to thereby immediately stop the flow of additional data to said buffer to thus prevent overflow and loss of data.

6. A system for capturing video image data from documents comprising
   document feed means for feeding successive documents from a hopper to a document transport,
   document transport means for receiving a plurality of documents from said documents feed means and for advancing each successive document past a document scanner,
   document scanner means for scanning the successively transported documents and for generating therefrom video image data, the quantity of which may vay widely depending upon the amount of information present on the document,
   video image data processing and compression means for receiving the video image data from said document scanner means and for processing and compressing the video image data, the quantity of the video image data emanating from said processing and compression means also varying widely depending upon the nature and quantity of the video image data which is received,
   a buffer for receiving and temporarily storing video image data,
   data input means for directing processed and compressed video iamge data from said data processing and compression means and into said buffer,
   data output means cooperating with said buffer for extracting video image data from the buffer, and
   control means cooperating with said buffer and operable to perform a hierarchy of control actions over the flow of video image data into said buffer to assure data integrity and prevent loss of data, said control means including
   a first control action means operable in response to the level of stored data in said buffer reaching a first threshold for effecting stopping of the feed of additional documents by said document feed means while allowing documents already in the document transport to continue in process, and
   a second control action means for sensing the rate at which said buffer is filling with data, and in response to said rate exceeding a predetermined limit, said second control action means being operable for effecting stopping of the feed of additional documents by said document feed means even though said first threshold may have been met.

7. A method for capturing video image data from documents comprising
   feeding successive documents from a hopper to a document transport,
   transporting each successive document past a document scanner and optically scanning the successively transported documents and generating therefrom video image data, the quantity of which may vary widely depending upon the amount of information present on the document,
   receiving and temporarily storing the video image data obtained by the document scanner in a buffer,
   extracting video image data from the buffer to a data output device, and performing a hierarchy of control actions over the flow of video image data into the buffer to assure data integrity and prevent loss of data, including (i) in response to the level of stored data in said buffer reaching a first threshold, effecting stopping of the feed of additional documents by said document feed means while allowing documents already in the document transport to continue in process, and (ii) sensing the rate at which said buffer is filling with data, and in response to said rate exceeding a predetermined limit, effecting stopping of the feed of additional documents by said document feed means even though said first threshold may not have been met.

8. The method as defined in claim 7 wherein said step of performing a hierarchy of control actions additionally includes (iii) effecting resuming of the feed of documents to the document transport in response to the level of stored data in the buffer reaching a second threshold lower than said first threshold.

9. The method as defined in claim 8 wherein said step of performing a hierarchy of control actions additionally includes (iv) effecting immediate stopping of the transport of documents in response to the level of stored data in the buffer reaching a third threshold higher than said first threshold so as to thereby immediately stop the flow of additional data to said buffer to thus prevent overflow and loss of data.

10. A method for capturing video image data from documents comprising feeding a plurality of successive documents from a hopper to a document transport, transporting a plurality of the documents along a predetermined path of travel and successively past a document scanner and optically scanning the documents and generating therefrom video image data, the quantity of which may vary widely depending upon the amount of information present on the document, processing and compressing the video image data obtained by the document scanner, receiving and temporarily storing the processed and compressed video image in a buffer, extracting video image data from the buffer to a data output device, and performing a hierarchy of control actions over the flow ov video image data into the buffer to assure data integrity and prevent loss of data, including (i) in response to the level of stored data in said buffer reaching a first threshold, effecting stopping of the feed of additional documents by said document feed means while allowing documents already in the document transport to continue in process, and (ii) sensing the rate at which said buffer is filling with data, and in response to said rate exceeding a predetermined limit, effecting stopping of the feed of additional documents by said document feed means even though said first threshold may not have been met.

* * * * *

UNITED STATES PATENT AND TRADEMARK OFFICE
CERTIFICATE OF CORRECTION

PATENT NO. : 5,025,483

DATED : June 18, 1991

INVENTOR(S) : Raymond F. Dinan, et al.

It is certified that error appears in the above-identified patent and that said Letters Patent is hereby corrected as shown below:

Column 1, line 34, "Nos." should be -- No. --.

Column 2, line 22, "computer,s" should be -- computer's --.

Column 3, line 10, "illustrated" should be -- illustrated --.

Column 5, line 34, "transports" should be -- transported --.

Column 8, line 19, "ov" should be -- of --.

Signed and Sealed this

Sixteenth Day of March, 1993

Attest:

STEPHEN G. KUNIN

Attesting Officer

Acting Commissioner of Patents and Trademarks